United States Patent Office 3,081,149
Patented Mar. 12, 1963

3,081,149
CATALYZING THE OXIDATIVE LEACHING OF URANIUM WITH NICKEL AMMONIUM SULFATE
Frank C. Haas, Grants, N. Mex., assignor to Phillips Petroleum Company, a corporation of Delaware
No Drawing. Filed Dec. 31, 1959, Ser. No. 863,074
5 Claims. (Cl. 23—14.5)

This invention relates to the recovery of uranium from uranium-bearing materials. In another aspect, it relates to the recovery of uranium values from uranium-bearing ores, such as those ores containing uranium in oxidation states lower than the hexavalent and particularly the uranous and mixed uranous-uranyl states, by oxidative leaching processes.

At the present time, there is an increasing demand for uranium as a source of atomic energy. Focus has been directed on hydrometallurgical processes as an efficient and cheap means for recovering uranium from uranium-bearing materials, and chiefly those chemical processes involving leaching or digestion of uranium-bearing ores with acids such as sulfuric acid or with alkaline reagents such as carbonate-bicarbonate solutions.

In the leaching of uranium-bearing materials, uranium in the hexavalent state dissolves in the leaching solution. For example, in the carbonate leach process it dissolves as the soluble, stable uranyl tricarbonate complex anion. However, uranium in the lower valent oxidation states, especially the tetravalent, does not dissolve in the leaching solutions and it is necessary to oxidize such uranium by resorting to chemical oxidative leaching of such ores. It is these leaching processes that are the concern of the subject invention, particularly the carbonate leaching process which is especially useful in leaching ores of high carbonate content.

In the chemical oxidative leaching of uranium-bearing ores containing uranium in the oxidation states lower than that of the hexavalent state, finely ground uranous or mixed uranous-uranyl ore is leached with a leaching solution and gaseous molecular free oxygen or a gas containing molecular free oxygen such as air. While this oxidative leaching process is generally satisfactory, the rate of oxidation and extraction has been found wanting and there has arisen a need for some way to accelerate the rate of oxidation and increase the extraction of uranium values from the ore. While it has been proposed to increase the rate of oxidation by carrying out the leaching operation in the presence of catalytic compounds such as copper oxide and sodium ferrocyanide, these compounds while often satisfactory are expensive and sometimes difficult to handle in commercial operations.

Accordingly, an object of this invention is to improve the recovery of uranium from uranium-bearing materials. Another object is to provide an improved process for extracting and recovering uranium values from uranium bearing ores, such as those ores containing uranium in the oxidation states lower than the hexavalent and particularly the uranous and mixed uranous-uranyl states, by oxidative leaching. Another object is to provide an improved process for catalytically promoting or accelerating the oxidative leaching of uranium ores, particularly those containing lower valent uranium compounds. Another object is to provide an improved process for catalytically accelerating the rate of the air oxidative carbonate leaching of uranium ores. Further objects and advantages of this invention will become apparent to those skilled in the art from the following discussion and appended claims.

Briefly stated, the subject invention comprises promoting or accelerating the oxidative leaching of uranium-bearing material by carrying out such leaching in the presence of nickel ammonium sulfate.

The subject invention will be described with reference to the widely used and preferred carbonate leaching process for recovery of uranium from uranium-bearing ores, but it should be understood that it is not to be unduly limited thereto.

In the carbonate leaching process, uranium-bearing ore, such as coffinite, is crushed and ground in the presence of an aqueous alkali metal carbonate such as a sodium carbonate-sodium bicarbonate mill solution. The resulting ore slurry is classified, thickened, and passed to a leaching zone maintained at elevated temperatures. The leaching zone can comprise one or more closed vessels in series, such as Pachuca tanks, operated at atmospheric pressure or slightly above atmospheric pressure, or autoclaves operated at superatmospheric pressure. I prefer to carry out the leaching operation in a plurality of Pachuca tanks, for example seven in series, designed to operate at a temperature between about 150 to 250° F., preferably 180 to 225° F., with a total residence time between 45 and 70 hours, and at atmospheric or slightly above atmospheric pressure, e.g., 8.5 p.s.i.g. The ore slurry in each Pachuca tank can contain from 5 to 65, or higher, weight percent solids, the remainder being carbonate leach solution having a pH of about 10 and containing from 30 to 60 grams per liter of sodium carbonate and from 10 to 20 grams per liter of sodium bicarbonate.

As mentioned hereinbefore, uranium compounds having uranium in the lower valent oxidation states, such as the tetravalent, do not dissolve and form water soluble compounds in the leach solution. Uranium-bearing ores containing uranium in the lower valent oxidation states include uranous ores, such as coffinite, and mixed uranous-uranyl ores, such as pitchblende and uraninite. Therefore, it is necessary to oxidize the uranous form to the uranyl form that is capable of forming the soluble, stable uranyl tricarbonate complex anion. This is accomplished, according to the practice of this invention, by contacting the ore slurry with gaseous molecular free oxygen and promoting this oxidation by carrying it out in the presence of nickel ammonium sulfate. Generally, the gaseous free oxygen employed will be air, which can be introduced into the bottom of the Pachuca tanks and countercurrently bubbled through the ore slurry therein. It is also within the scope of this invention to employ oxygen, ozone, and the like in place of or in addition to the air. The air which is preferably used is passed into each of the leach vessels, the amount of total air employed depending on the uranium content of the ore, measured as $U_3O_8$, particularly the portion of uranium in the subhexavalent state. Generally, where secondary uranium mineral deposits or ores are used, having from about 0.01 to 1 weight percent $U_3O_8$, about 1000 to 5000 s.c.f. of air per ton of ore can be employed.

The nickel ammonium sulfate, used to promote or accelerate the oxidative leaching of the ore, can be added either to the ore grinding mills, the thickeners, or any other point upstream of the leach tanks, or directly to the latter. I prefer to add the catalytic oxidant, either as an aqueous or alkaline carbonate solution, to the thickener underflow. The amount of nickel ammonium sulfate employed is small and can be functionally defined as a catalytic or oxidation accelerating amount. For secondary uranium ores, the amount of nickel ammonium sulfate generally used will be in the range between about 0.1 and 10 pounds per ton of ore, with about 2 pounds per ton of ore being generally applicable for ores containing 0.2 to 0.6 weight percent $U_3O_8$.

The use of nickel ammonium sulfate catalytic oxidant results in a faster and more complete extraction of the uranium ores, particularly the tetravalent uranium values. The resulting leached residue or leached ore has a materially lower insoluble uranium content, and the practice of this invention results in the production of a uranium pregnant liquor having a materially higher $U_3O_8$ content. Also, the retention time in the leaching circuit can be reduced as well as the amount and extent of aeration. Thus, the practice of this invention results in an increase in the efficiency and economy of the uranium hydrometallurgical process.

Following leaching, the extracted uranium values can be separated and recovered from the leached pulp by any of the conventional methods. Generally, these methods involve filtering or centrifuging the leached pulp to remove leached ore or residue, commonly called "tailings," and the soluble uranium values recovered as a uranium concentrate from the pregnant leach solution by precipitation, ion exchange, liquid extraction, etc. For example, in the carbonate leaching process, the leached pulp is filtered in a multistage vacuum filtration zone, the filtered leached pulp is washed with recycle carbonate solution, recarbonated barren liquor, and fresh water, and the residue or tailings sent to a disposal pond or recycled to the leaching operation. The filtrate or pregnant leach solution, is then generally passed through a precoated drum filter and clarified. The clarified pregnant leach solution is then passed to a precipitation tank where the soluble uranium values are precipitated by the addition of aqueous sodium hydroxide. The resulting precipitate-containing solution is then thickened and the thickened slurry filtered, for example in a drum filter, to recover the precipitated uranium values, commonly referred to as "yellow cake" and comprising impure sodium diuranate. The overflow from the yellow cake thickeners, commonly called "barren liquor," is then recarbonated by passing carbon dioxide through it, using for example a supply of waste carbon dioxide such as flue gas. The recarbonated barren liquor is then employed as a wash liquid in a filtration of the leached pulp and then recycled to the leaching operation for reuse. The yellow cake concentrate will generally comprise at least 75 weight percent $U_3O_8$, and it is dried, bagged and sold to the Atomic Energy Commission for further refining to a reactor-grade uranium product.

The following examples further illustrate the objects and advantages of this invention, but it should be understood that the various amounts, conditions, etc., recited in these examples are not to be construed so as to unduly limit this invention.

EXAMPLE I

A sample of uranium-bearing ore containing 0.266 weight percent $U_3O_8$ was leached with a mill leach solution containing approximately 1.0 gram/liter $U_3O_8$, 50 grams/liter $Na_2CO_3$, and 15 grams/liter $NaHCO_3$, and 2 pounds/ton of ore of nickel ammonium sulfate, for 66 hours at 190° F. with 0.694 cubic foot of air being bubbled through the ore slurry per ton of ore per minute. The 66 hour leached residue contained 0.009 weight percent $U_3O_8$, representing a uranium extraction of 96.62 percent.

Another sample of the same uranium-bearing ore was leached according to the identical procedure, except that no nickel ammonium sulfate was added to the leaching operation. The 66 hour leached residue obtained in this run contained 0.015 weight percent $U_3O_8$, representing a uranium extraction of 94.36 weight percent. Comparison of the results of this run with those above show that the use of nickel ammonium sulfate, according to the practice of this invention, resulted in a 2.26 percent increase in extraction of soluble uranium values.

EXAMPLE II

In this example, a sample of coffinite comprising 0.48 weight percent $U_3O_8$ and 0.202 weight percent $V_2O_5$ was leached according to the subject invention. The ore slurry contained 50 weight percent solids and was leached at 194° F. with 0.7 cubic foot of air/minute/ton of ore, in the presence of 1 pound/ton of ore of nickel ammonium sulfate. At the end of 18 hours' leaching, 87.89 weight percent $U_3O_8$ present in the ore sample was extracted, at the end of 42 hours 93.96 weight percent $U_3O_8$ was extracted, and at the end of 66 hours 93.96 weight percent $U_3O_8$ was extracted. The 66 hour residue contained 0.029 weight percent $U_3O_8$.

Another sample of the coffinite ore was leached according to the identical procedure above, except that in this run no nickel ammonium sulfate was added during the leaching operation. In this run, at the end of 18 hours' leaching, 86.95 percent of the $U_3O_8$ present in the ore was extracted, at the end of 42 hours 92.92 weight percent $U_3O_8$ was extracted, and at the end of 66 hours 92.92 weight percent $U_3O_8$ was extracted. This 66 hour residue analyzed 0.034 weight percent $U_3O_8$. Comparison of the degree of extraction of the uranium of this run with that above showed that the extraction carried out according to this invention resulted in an increase of 1.04 percent extraction.

EXAMPLE III

In this example, there is detailed the improved leaching operation of this invention on a commercial scale. For purposes of comparison, there is also detailed on a commercial scale a leaching operation in a conventional plant using sodium ferrocyanide as a catalytic oxidant.

In both of these commercial runs, the following identical conditions are used. Coffinite ore comprising 0.250 weight percent $U_3O_8$ and 0.060 weight percent $V_2O_5$ is leached with a mill leach solution comprising 1.20 grams/liter $U_3O_8$, 0.49 gram/liter $V_2O_5$, 37.2 grams/liter $Na_2CO_3$, and 10.0 grams/liter $NaHCO_3$. Ore is supplied to the commercial plant at a rate of 1000 tons per day and in each run a leach circuit comprising 7 Pachuca tanks in series is employed. The ore slurry is fed to the leach circuit at a rate of 237 gallons per minute and the leached pulp is discharged from the leach circuit at a rate of 209 gallons of leach pulp per minute. The leach tanks are operated at 200° F. and 8.5 p.s.i.g. pressure at the top of each tank. The feed passed to the leach circuit comprises 46.1 weight percent solids, and the discharge from the leach circuit comprises 50.4 weight percent solids. Residence time within the leach circuit totals 50.8 hours. During the leaching operation, air at the rate of 3024 s.c.f. per ton of ore is supplied, and 28 gallons of water per minute are evaporated.

In the leaching circuit operated according to the subject invention, 2 pounds of nickel ammonium sulfate per ton of ore is employed. In the conventional leaching circuit, 0.5 pound per ton of ore of sodium ferrocyanide is employed. The comparative extractions resulting from both of these leaching operations are tabulated in Table I.

Table I

USING NICKEL AMMONIUM SULFATE AS CATALYTIC OXIDANT

| Leach tank | Analysis of leached residue | | Analysis of pregnant leach solution | |
|---|---|---|---|---|
| | $U_3O_8$, wt. percent | $U_3O_8$, lbs. | $U_3O_8$, wt. percent | $U_3O_8$, lbs. |
| 1 | 0.034 | 225.1 | 3.05 | 2358.7 |
| 2 | 0.026 | 175.9 | 3.18 | 2434.8 |
| 3 | 0.018 | 124.4 | 3.32 | 2513.2 |
| 4 | 0.014 | 98.8 | 3.42 | 2565.7 |
| 5 | 0.009 | 64.9 | 3.54 | 2627.0 |
| 6 | 0.009 | 66.2 | 3.61 | 2653.1 |
| 7 | 0.009 | 67.5 | 3.69 | 2678.7 |

USING SODIUM FERROCYANIDE AS CATALYTIC OXIDANT

| | | | | |
|---|---|---|---|---|
| 1 | 0.046 | 304.5 | 2.95 | 2280.3 |
| 2 | 0.036 | 243.6 | 3.09 | 2667.1 |
| 3 | 0.026 | 179.7 | 3.24 | 2457.9 |
| 4 | 0.022 | 155.3 | 3.35 | 2509.2 |
| 5 | 0.018 | 129.7 | 3.45 | 2562.2 |
| 6 | 0.016 | 117.7 | 3.54 | 2601.6 |
| 7 | 0.015 | 112.5 | 3.63 | 2633.7 |

Inspection of the data in Table I shows that whereas 0.015 weight percent $U_3O_8$ remain unrecovered in the leached residue in that run where sodium ferrocyanide is employed, only 0.009 weight percent $U_3O_8$ remain unrecovered in that residue wherein leaching of the ore is accomplished in the presence of nickel ammonium sulfate. Stated another way, the leaching operation carried out according to the practice of this invention results in a 0.12 pound $U_3O_8$ per ton of ore increase in recovery. Looking at this data with an eye on relative costs, assuming the sodium ferrocyanide is consumed at a cost of 8.33 cents/ton of ore and nickel ammonium sulfate is consumed at a cost of 62 cents/ton of ore, and an AEC price for $U_3O_8$ of $8.00/pound, the practice of this invention will amount to a savings of $0.96/ton of ore, or on a 2000 tons of ore/day throughput, $1920/day. The increase in cost of nickel ammonium sulfate over that of sodium ferrocyanide is $1073.40/day, resulting in a net savings of $846.60/day. An additional benefit derived from the use of nickel ammonium sulfate is the increase in extraction rate, making it possible to operate at high tonnages without detriment to the overall leaching operation.

Various modifications and alterations of this invention will become apparent to those skilled in the art from the foregoing discussion and examples, and it should be understood that this invention is not to be unduly limited to those preferred embodiments and examples set forth hereinbefore for illustrative purposes.

I claim:
1. In a process of leaching uranium-bearing material in the presence of molecular free oxygen, the improvement comprising carrying out the leaching operation in the presence of about 0.1 to 10 pounds of nickel ammonium sulfate per ton of uranium-bearing material.
2. In a process of leaching uranium-bearing ore with an aqueous leach solution of an alkali metal carbonate and molecular free oxygen, the improvement comprising carrying out the leaching operation in the presence of an oxidation accelerating amount of about 0.1 to 10 pounds of nickel ammonium sulfate per ton of said ore.
3. In a process of leaching uranium-bearing ore containing uranium in the subhexavalent state, wherein said ore is treated with an aqueous leach solution of an alkali metal carbonate in a leaching zone in the presence of a gas containing molecular free oxygen supplied to said leaching zone, the improvement which comprises carrying out the leaching operation in the presence of about 0.1 to 10 pounds of nickel ammonium sulfate per ton of said ore.
4. The process according to claim 3 wherein said gas containing molecular free oxygen is air.
5. The process according to claim 4 wherein said leach solution is an aqueous sodium carbonate-sodium bicarbonate solution.

References Cited in the file of this patent
UNITED STATES PATENTS

| 2,738,253 | Thunaes et al. | Mar. 13, 1956 |
| 2,813,003 | Thunaes et al. | Nov. 12, 1957 |

OTHER REFERENCES

Macdonald: "Chem. Eng. Progress Symposium Series," vol. 50, No. 11, pages 69–74, May 28, 1954.

Brown et al.: "Chem. Eng. Progress Symposium Series," vol. 50, No. 13, pages 5–10 (1954).

Seaborg et al.: "The Actinide Elements," pages 172, 173 (1954).

WIN 86, pp. 4, 6, 9, 10–16, 27, Aug. 23, 1957.